(12) United States Patent
Ding

(10) Patent No.: US 11,567,743 B1
(45) Date of Patent: Jan. 31, 2023

(54) INTEGRATED TESTING TOOL FOR DATA REPLICATION

(71) Applicant: SAP SE, Walldorf (DE)

(72) Inventor: Xuemin Ding, Shagnhai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/412,655

(22) Filed: Aug. 26, 2021

(51) Int. Cl.
*G06F 8/38* (2018.01)
*G06F 16/27* (2019.01)

(52) U.S. Cl.
CPC .............. *G06F 8/38* (2013.01); *G06F 16/273* (2019.01)

(58) Field of Classification Search
CPC .................................. G06F 8/38; G06F 16/273
See application file for complete search history.

(56) References Cited

U.S. PATENT DOCUMENTS

| | | | | |
|---|---|---|---|---|
| 6,393,540 | B1* | 5/2002 | Blumenau | G06F 3/064 714/E11.12 |
| 8,417,669 | B2* | 4/2013 | Xu | G06F 16/27 707/638 |
| 2005/0198074 | A1* | 9/2005 | Khayter | G06F 16/27 |
| 2010/0274759 | A1* | 10/2010 | Takeuchi | G06F 16/275 707/624 |
| 2017/0147672 | A1* | 5/2017 | Arnold | H04L 67/565 |
| 2020/0364239 | A1* | 11/2020 | Kumar | G06F 16/2282 |
| 2021/0056119 | A1* | 2/2021 | Maj | G06F 16/273 |
| 2021/0334246 | A1* | 10/2021 | Seelemann, II | G06F 16/27 |

OTHER PUBLICATIONS

Sharathkumar, "An Automated Data Warehouse" (Year: 2003).*
RF Van Der Lans, "Data Replication for Enabling Operational BI" (Year: 2012).*

* cited by examiner

*Primary Examiner* — Phillip H Nguyen
(74) *Attorney, Agent, or Firm* — Schwegman Lundberg & Woessner, P.A.

(57) ABSTRACT

Techniques for implementing an integrated testing tool for data replication are disclosed. In some embodiments, a software tool performs operations comprising: causing a first set of user interface elements to be displayed on a computing device; receiving, via the first set of user interface elements, a data replication configuration identifying an adapter, a source database, and a target database; storing the data replication configuration in an embedded database; causing a second set of user interface elements to be displayed on the computing device; receiving, via the second set of user interface elements, a data generation configuration identifying a table in the source database; generating random data in the table based on the data generation configuration; instructing the adapter to replicate the source data from the source database onto the target database based on the data replication configuration; and causing a log of events to be displayed on the computing device.

20 Claims, 13 Drawing Sheets

INTEGRATED TESTING TOOL FOR DATA REPLICATION

BACKGROUND

Data may be replicated from one database to another database. Currently, when a user wants to test components of a system that performs data replication, the user must use multiple software tools to perform a variety of different tasks associated with testing the components of the system. There are technical problems caused by this reliance on using multiple software tools. For example, the opening of multiple software tools and navigating between them results places a burden on the computer resources involved, since running multiple software tools consumes more processing power and more screen space than a single software tool. Additionally, the user interface experience suffers from the user having to navigate between the different software tools. In addition to the issues discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
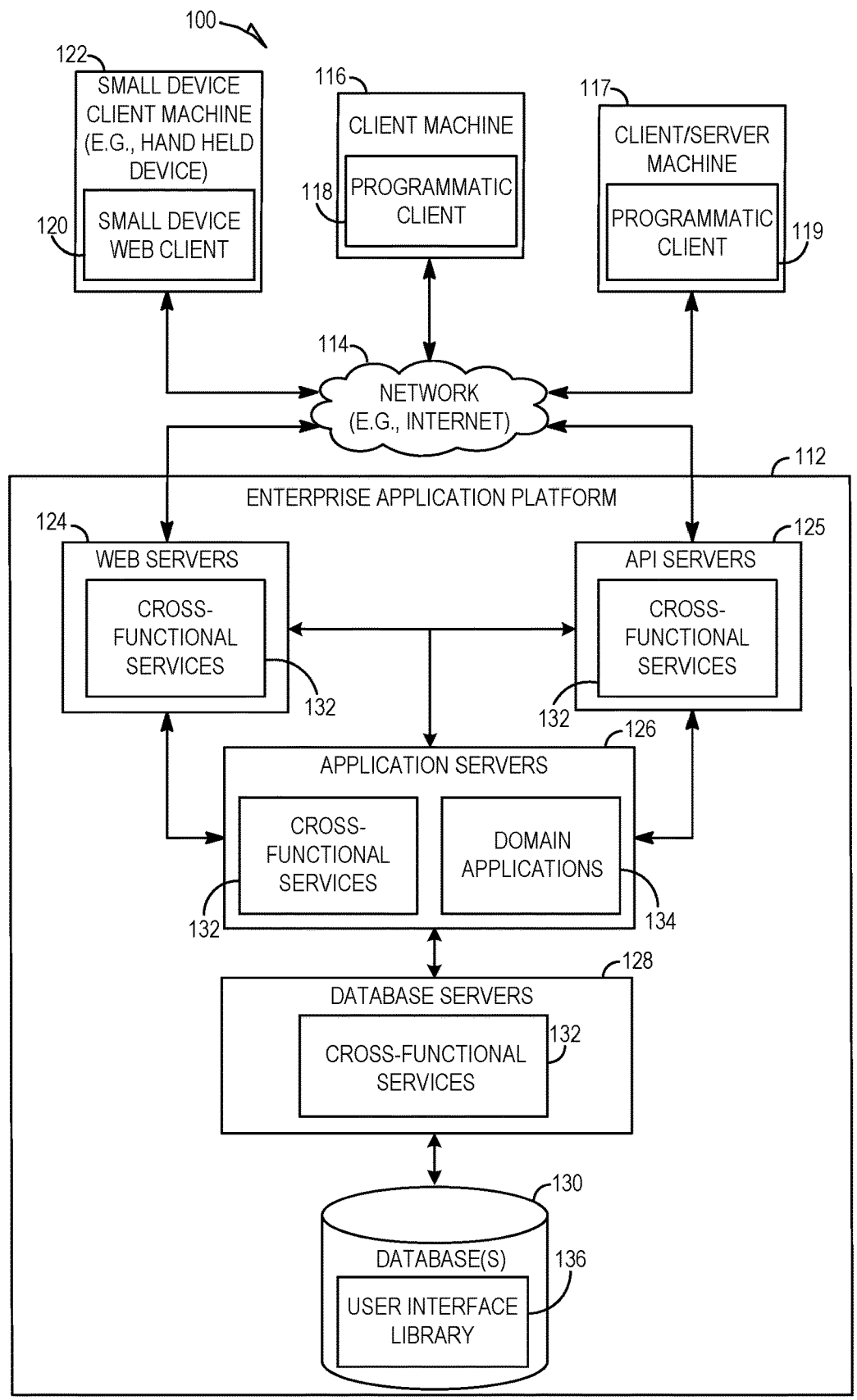
FIG. 1 is an example network diagram illustrating a system.

Example methods and systems for implementing an integrated testing tool for data replication are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to implement an integrated testing tool for data replication, thereby providing a single software tool that a user can use to perform multiple different tasks for data replication. In some example embodiments, the single software tool performs operations comprising: causing a first set of user interface elements of the software tool to be displayed on a computing device; receiving, from the computing device via the first set of user interface elements, a data replication configuration identifying an adapter, a source database, and a target database; storing the data replication configuration in an embedded database of the software tool; causing a second set of user interface elements of the software tool to be displayed on the computing device; receiving, from the computing device via the second set of user interface elements, a data generation configuration identifying a table in the source database; generating random data in the identified table based on the data generation configuration; instructing the adapter to perform replicating of the source data from the source database onto the target database based on the data replication configuration stored in the embedded database of the software tool; and causing a log of events to be displayed on the computing device, the log of events comprising the generating of the random data in the identified table and the replicating of the source data from the source database onto the target database.

As a result of the features disclosed herein, the consumption of computer resources is reduced, since the use of a single software tool avoids the opening of and navigating between multiple software tools, and an improved user interface is provided, since the user no longer has to navigate between different software tools. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
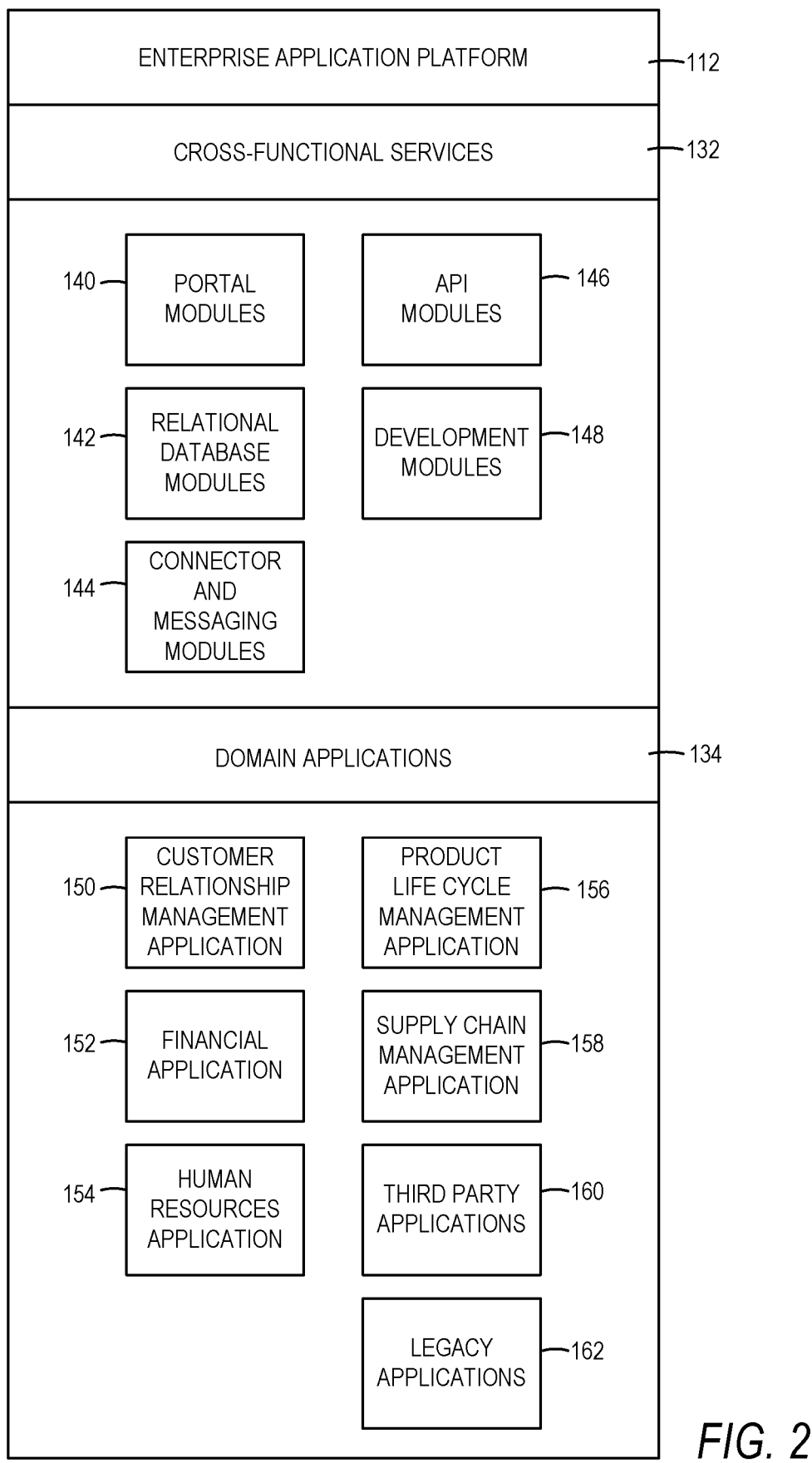
FIG. 2 is a block diagram illustrating example enterprise applications and services in an enterprise application platform.

FIG. 2 is a block diagram illustrating example enterprise applications and services in an enterprise application platform 112. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
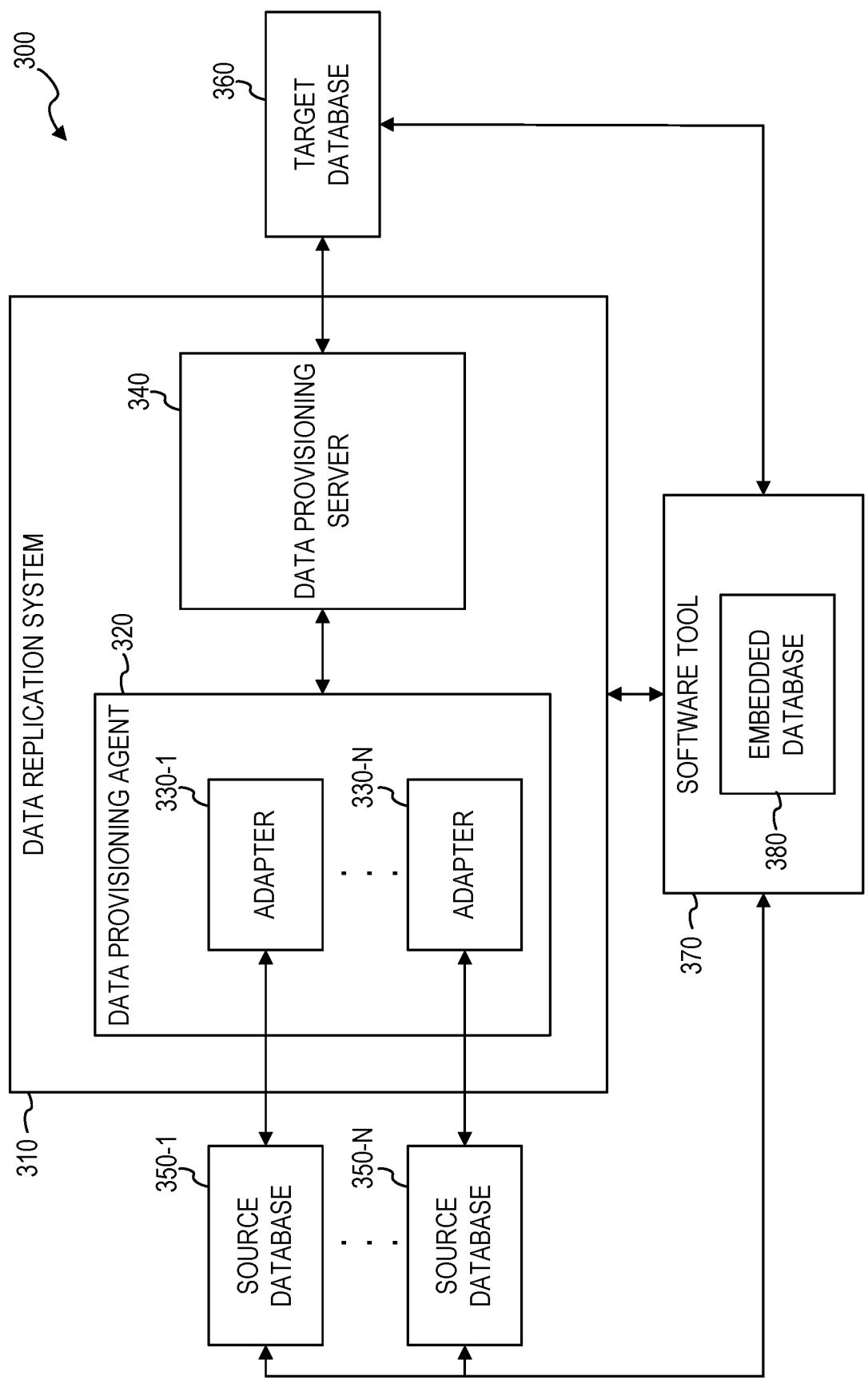
FIG. 3 is a block diagram illustrating an example environment in which a software tool operates.

FIG. 3 is a block diagram illustrating an example environment 300 in which a software tool 370 operates. In some embodiments, the example environment 300 comprises a data replication system 310, a plurality of different source databases 350 (e.g., source database 350-1, . . . , source database 350-N), and a target database 360. The data replication system 310 may be configured to replicate data from any of the source databases 350 onto the target database 360. The data replication system 310 may comprise a data provisioning agent 320, which may be implemented as a client-side component (e.g., on the client machine 116 in FIG. 1), and a data provisioning server 340, which may be implemented as a server-side component (e.g., on the enterprise application platform 112 in FIG. 1). In some example embodiments, the data provisioning agent 320 is configured to collect data from the different source databases 350 and transmit the collected data to the data provisioning server 340, where the data provisioning server 340 may then persist the collected data to the target database 360. The data provisioning agent 320 may comprise a plurality of adapters 330 (e.g., adapter 330-1, . . . , adapter 330-N), with each adapter 330 corresponding to a different source database 350. For example, the data provisioning agent 320 may comprise a first adapter 330-1 that is configured to communicate with a first source database 350-1, a second adapter 330-2 that is configured to communicate with a second source database 350-2, a third adapter 330-3 that is configured to communicate with a third source database 350-3, and so on and so forth. The data provisioning agent 320 can manage the adapters 330, selecting a particular adapter 330 to use in replicating data from a particular source database 350 corresponding to the particular adapter 330 onto the target database 360.

A software developer may create and modify the adapters 330, such as by creating new features for the adapters. The software developer may then want to test the performance of the adapters 330 to make sure that they successfully perform data replication in an effective and efficient manner. Instead of having to use multiple different tools to create testing data (e.g., new tables or new rows in the source database 350) to prepare for the replication, to replicate the data, and to check the source database 350 and the target database 360 to determine whether the data replication was successful, the user may use the software tool 370 to perform all of these tasks. In some example embodiments, the software tool 370 is configured to function as an integrated testing tool that enables a user to perform a variety of different tasks related to data replication without having to open of and navigate between multiple software tools.

In some example embodiments, the software tool 370 resides on a computer system, or other machine, having a memory and at least one processor (not shown) and is connected to the data replication system 310, the source databases 350, and the target database 360. The software tool 370 may be configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, the software tool 370 may be configured to receive user input. For example, the software tool 370 can present one or more graphical user interface (GUI) elements (e.g., drop-down menu, selectable buttons, text field) with which a user can submit input. The software tool 360 may also be configured to perform various communication functions to facilitate the functionality described herein, such as by communicating with any of the other components in the environment 300 (e.g., the data replication system 310, the source databases 350, and the target database 360) via the network 114 using a wired or wireless connection.

In some example embodiments, the software tool 370 comprises an embedded database 380. The embedded database 380 may be dedicated to the software tool 370 rather than shared among multiple software tools or applications. The embedded database 380 may be included and packaged into the software tool 370 and managed by the software tool 370. In some example embodiments, the software tool 370 uses the embedded database 380 to store configuration information provided by a user, as will be discussed in further detail below.

Figure 4:
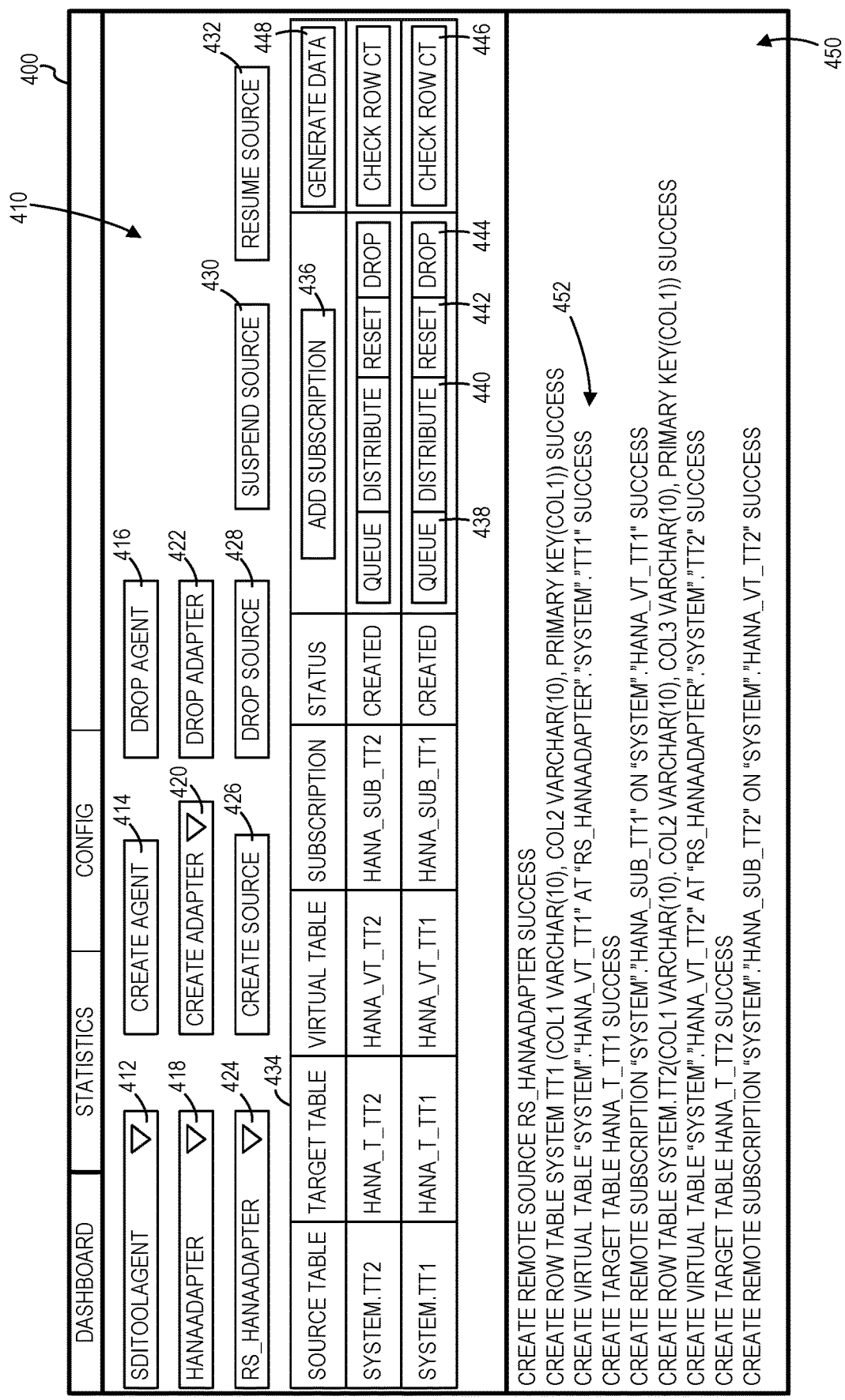
FIG. 4 illustrates an example graphical user interface (GUI) of a software tool via which a data replication configuration is received.

In some example embodiments, the software tool 370 is configured to receive, from a computing device (e.g., the client machine 116 or the small client machine 122 in FIG. 1) via a first set of user interface elements of the software tool 370 displayed on the computing device, a data replication configuration identifying an adapter 330, a source database 350, and a target database 360. For example, the software tool 370 may cause the first set of user interface elements to be displayed on the computing device and then receive user input via the first set of user interface elements. FIG. 4 illustrates an example GUI 400 of the software tool 370 via which a data replication configuration is received. In FIG. 4, the GUI 400 includes selectable user interface elements 412, 414, 416, 418, 420, 422, 424, 426, 428, 430, and 432

The selectable user interface element 412 may be used by the user to select a data provisioning agent 320 for use in data replication. For example, the selectable user interface element 412 may comprise a drop-down menu including a list of data provisioning agents 320 that are available for selection. If no data provisioning agents 320 are available for selection via the selectable user interface element 412 or if a specific data provisioning agent 320 that the user wants to use is not available for selection via the selectable user interface element 412, then the user may select the selectable user interface element 414, which may trigger a display of one or more user interface elements configured to enable the user to find and associate a local data provisioning agent instance with the data provisioning server 340, resulting in the local data provisioning agent instance being available for selection via the selectable user interface element 412. The user may also use the selectable user interface element 416 to drop or remove the data provisioning agent instance that is selected via the selectable user interface element 412.

The selectable user interface element 418 may be used by the user to select an adapter 330 for use in data replication. For example, the selectable user interface element 418 may comprise a drop-down menu including a list of adapters 330 that are available for selection. If no adapters 330 are available for selection via the selectable user interface element 418 or if a specific adapter 330 that the user wants to use is not available for selection via the selectable user interface element 418, then the user may select the selectable user interface element 420, which may trigger a display of one or more user interface elements configured to enable the user to find and associate an adapter with the data provisioning server 340, resulting in the adapter 340 being available for selection via the selectable user interface element 412. The user may also use the selectable user interface element 422 to drop or remove the adapter 340 that is selected via the selectable user interface element 418.

Figure 5:
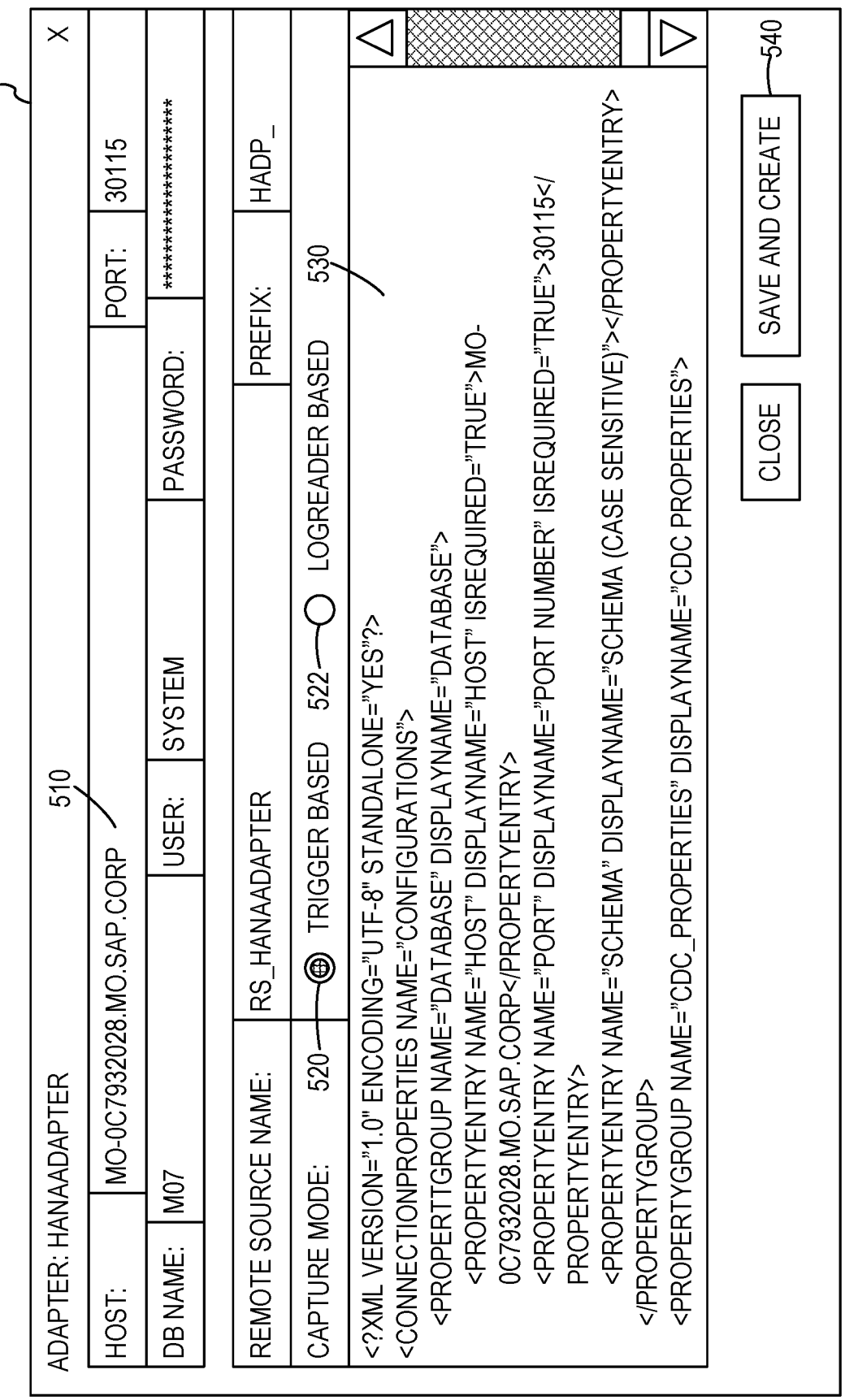
FIG. 5 illustrates an example GUI of the software tool via which a source database is created.

The selectable user interface element 424 may be used by the user to select a source database 350 for use in data replication. For example, the selectable user interface element 424 may comprise a drop-down menu including a list of source databases 350 that are available for selection. The user may select the selectable user interface element 426 to edit aspects of the source database 350. FIG. 5 illustrates an example GUI 500 of the software tool 370 via which a source database 350 is created. The GUI 500 may be displayed in response to a user selection of the selectable user interface element 426. The GUI 500 may be configured to enable the user to edit aspects of the source database 350. For example, the user may specify a host for the source database 350 via field 510. The user may also specify a capture mode for the data replication via a selectable user interface element 520 for a trigger-based capture mode and a selectable user interface element 522 for a log-based capture mode. Additionally, the user may use field 530 to edit the XML source definition of the source database 350. The user may then select the selectable user interface element 540 to save the configuration of the source database 350.

Referring back to FIG. 4, the selectable user interface element 428 is configured to remove the selected source database 350 from the configuration for data replication, thereby resetting the selectable user interface element 424. The selectable user interface element 430 is configured to suspend all the subscriptions for the selected source database 350. A subscription is a request for future data replication with respect to the selected source database 350. The subscription may involve repeated instances of data replication. For example, the subscription may be configured to trigger data replication as in response to future events, such as any time a database transaction is completed. The user may create multiple subscriptions for the same selected database 350, with each subscription specifying a source table in the source database 350 and a target table in the target database 360. If a particular subscription has been created and is actively running, a user selection of the selectable user interface element 430 may suspend the subscription. The user may then select the selectable user interface element 432 in order to trigger a resumption of all the subscriptions on the selected source database 350.

In some example embodiments, the GUI 400 includes a user interface element 434 (e.g., a table) in which the details of each subscription are displayed, including, but not limited to, an identification of source table, an identification of a target table, an identification of a virtual table, an identification of the subscription, and an indication of the status of the subscription (e.g., created, suspended).

Figure 6:
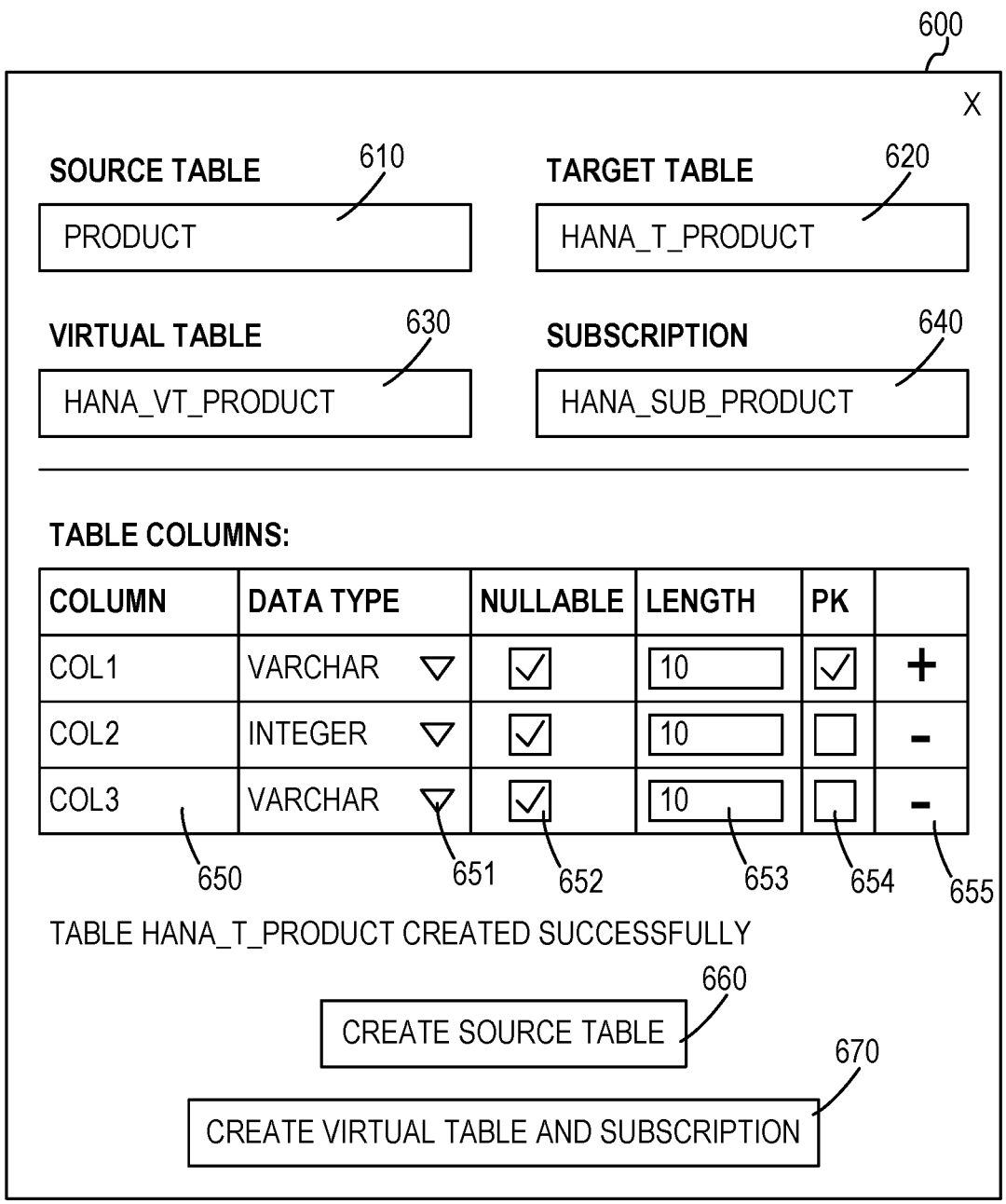
FIG. 6 illustrates an example GUI of the software tool via which a source table and a target table are created.

The selectable user interface element 436 may be configured to enable the user to define and create a subscription for the selected source database 350. The selectable user interface element 436 may be configured to, in response to its selection, trigger a display of a window in which the user may use one or more user interface elements to define the source table, as well as other elements of the subscription. FIG. 6 illustrates an example GUI 600 of the software tool 370 via which a source table and a target table are created. In some example embodiments, in response to the user selecting the selectable user interface element 436, the software tool 370 triggers the GUI 600 to be displayed, such as in the form of a pop-up window overlaying the GUI 400. The GUI 600 may include a field 610 in which the user may enter an identification of the source table from which the user wants the data provisioning agent 320 to replicate data. The GUI 600 may also include a field 620 for an identification of the target table, a field 630 for an identification of a virtual table, and a field 640 for an identification of the subscription. The fields 620, 630, and 640 may be auto-filled based on the text entered by the user into the filed 610, such as by adding a target table prefix (e.g., "HANA_T_") in front of the identification of the source table (e.g., "PRODUCT") to generate the identification for the target table (e.g., "HANA_T_PRODUCT"). Additionally or alternatively, the user may enter the identifications directly into the fields 620, 630, and 640.

In some example embodiments, the GUI 600 also includes selectable user interface elements that the user may use to define attributes of the source table. For example, the GUI 600 may display an identification of a column 650 along with a user interface element 651 configured to enable the user to select a data type for the corresponding column, a user interface element 652 configured to enable the user to select whether or not the corresponding column is nullable, a user interface element 653 configured to enable the user to specify a length for the corresponding column, and a user interface element 654 configured to enable the user to specify whether or not the corresponding column is a primary key. Additionally, the GUI 600 may also include a corresponding user interface element 655 configured to, in response to its selection, either add another column to the source table or remove the corresponding column from the source table. When the user is finished defining the source table, the user may then select a selectable user interface element 660 configured to trigger the creation of the source table in the selected source database 350. Additionally, the user may select a selectable user interface element 670 configured to trigger the creation of the target table, virtual table, and the subscription.

In response to the user selecting the selectable user interface element 670 in FIG. 6, the software tool 370 may create the subscription and update the user interface element 434 to reflect the creation of the subscription. Once the subscription is created, the software tool 370 may display selectable user interface elements 438, 440, 442, and 444 configured to modify the state of the subscription in response to their respective selection. For example, the selectable user interface element 438 may be configured to trigger preparation of the real time replication defined by the subscription in response to its selection, the selectable user interface element 440 may be configured to start the real time replication according to the subscription in response to its selection, the selectable user interface element 442 may be configured to stop the real time replication in response to its selection, and the selectable user interface element 4444 may be configured to cancel the real time replication in response to its selection.

In some example embodiments, the software tool 370 is configured to store the data replication configuration in the embedded database 380 of the software tool 370. For example, the software tool 370 may store the input provided by the user via the user interface elements of the GUI's 400, 500, and 600 as the data replication in the embedded database 380. The stored data replication configuration may then be accessed and used to provide instructions to the data provisioning agent 320 or to one of its adapters 330 for performing data replication.

In some example embodiment, the software tool 370 is configured to enable the user to test the data replication configuration to verify that data replication is properly performed. Rather than having to use a separate software tool to test the data replication configuration, the user may use the same software tool 370 as was used by the user to create the data replication configuration. As a result of this integrated testing feature, an improved user interface is provided to the end user, and the tasks associated with data replication are performed more easily and more efficiently.

In order to verify that the data replication configuration and the corresponding subscription is working properly, the user may use the software tool 370 to generate data in the source table in the source database 350 in order to verify whether the data replication system 310 replicates the generated data into the target table in the target database 360. In some example embodiments, the software tool 370 provides a set of user interface elements configured to enable the user to configure and submit a data generation configuration. For example, the GUI 400 may include a selectable user interface element 448 configured to, in response to its selection, trigger a display of a GUI via which a data generation configuration may be received from the user.

Figure 7:
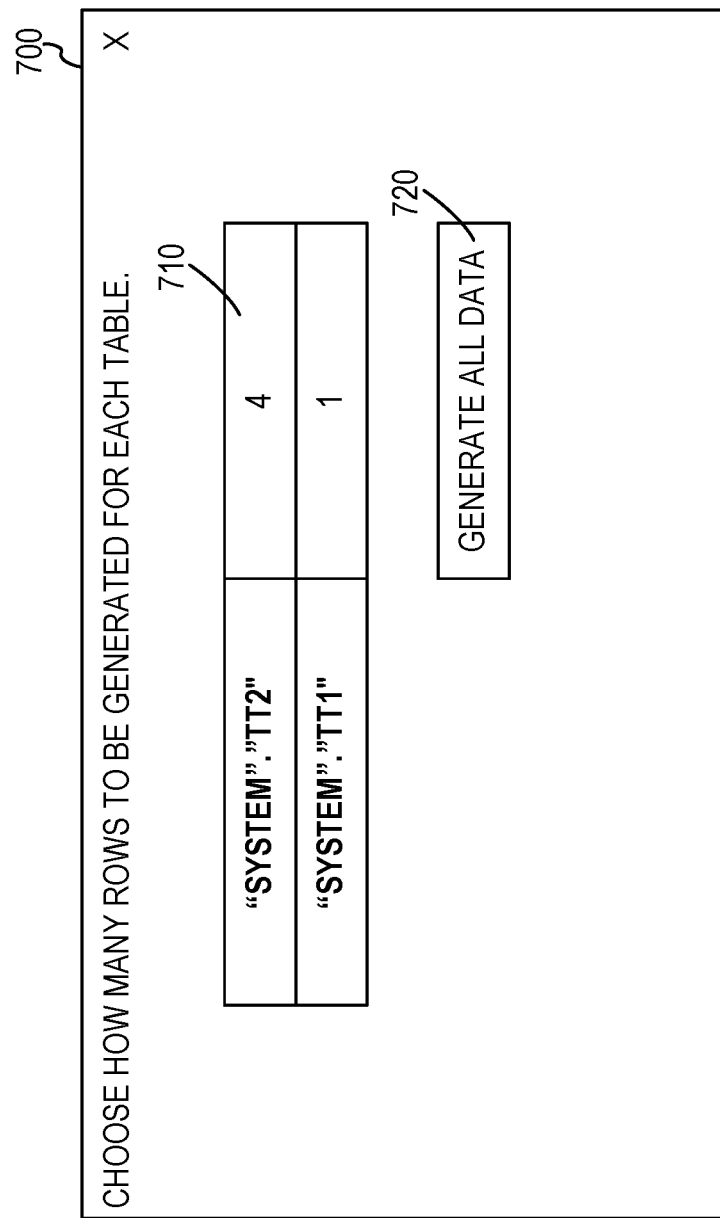
FIG. 7 illustrates an example GUI of the software tool via which a data generation configuration is received.

FIG. 7 illustrates an example GUI 700 of the software tool 370 via which a data generation configuration is received. The software tool 370 may cause the GUI 700 to be displayed to the user in response to the selection of the selectable user interface element 448. In the GUI 700 of FIG. 7, a corresponding field 710 is displayed in association with each source table that is indication in the user interface element 434 as having a corresponding subscription. The field 710 is configured to receive a number of rows for which to generate random data in the corresponding source table. For example, in FIG. 7, the user has specified that 4 rows be randomly generated for the source table "SYSTEM.TT2" and that 1 row be randomly generated for the source table "SYSTEM.TT1." The user may select a selectable user interface element 720 to submit the corresponding number of rows for each source table as the data generation configuration. In response to receiving the data generation configuration via the GUI 700, the software tool 370 may communicate with the selected source database 350 to insert the random data into the corresponding source tables in accordance with the data generation configuration. The software tool 370 may use a random number generator to generate random data to insert into the source tables.

As a result of the insertion of the random data into the source tables of the source database 350, the software tool 370 may detect the change to the source tables of the source database 350, and then instruct the corresponding adapter 330 of the data provisioning agent 320 to replicate the change of data in the corresponding target tables of the target database 360 based on the data replication configuration stored in the embedded database 380. In some example embodiments, the software tool 370 is configured to enable the user to verify that the change of data has been replicated into the target tables of the target database 360. For example, the GUI 400 may display a corresponding selectable user interface element 446 for each table that has a corresponding subscription. The selectable user interface element 446 may be configured to, in response to its selection, cause the software tool 370 to access the target tables of the target database 360, determine corresponding row count for the target table corresponding to the selected user interface element 446, and then display the corresponding row count on the computing device of the user. For example, the software tool 370 may display the corresponding row count in a text-based user interface 450 that is dedicated for displaying a log of events 452.

The log of events 452 may comprise indications of the generating of the random data in the source table and the replicating of the source data from the source table into the target table, as well indications of any other operations, transactions, or other events that occur in the environment 300 resulting from use of the software tool 370, such as any operations, transactions, or other events occurring within the data replication system 310, within the source database 350, or within the target database 360 via use of the software tool 370. In one example, the result of the random data generation discussed above is displayed in the user interface 450, showing how many rows were inserted into the source table of the source database 350 and how many rows were replicated into the target table of the target database 360.

Figure 8:
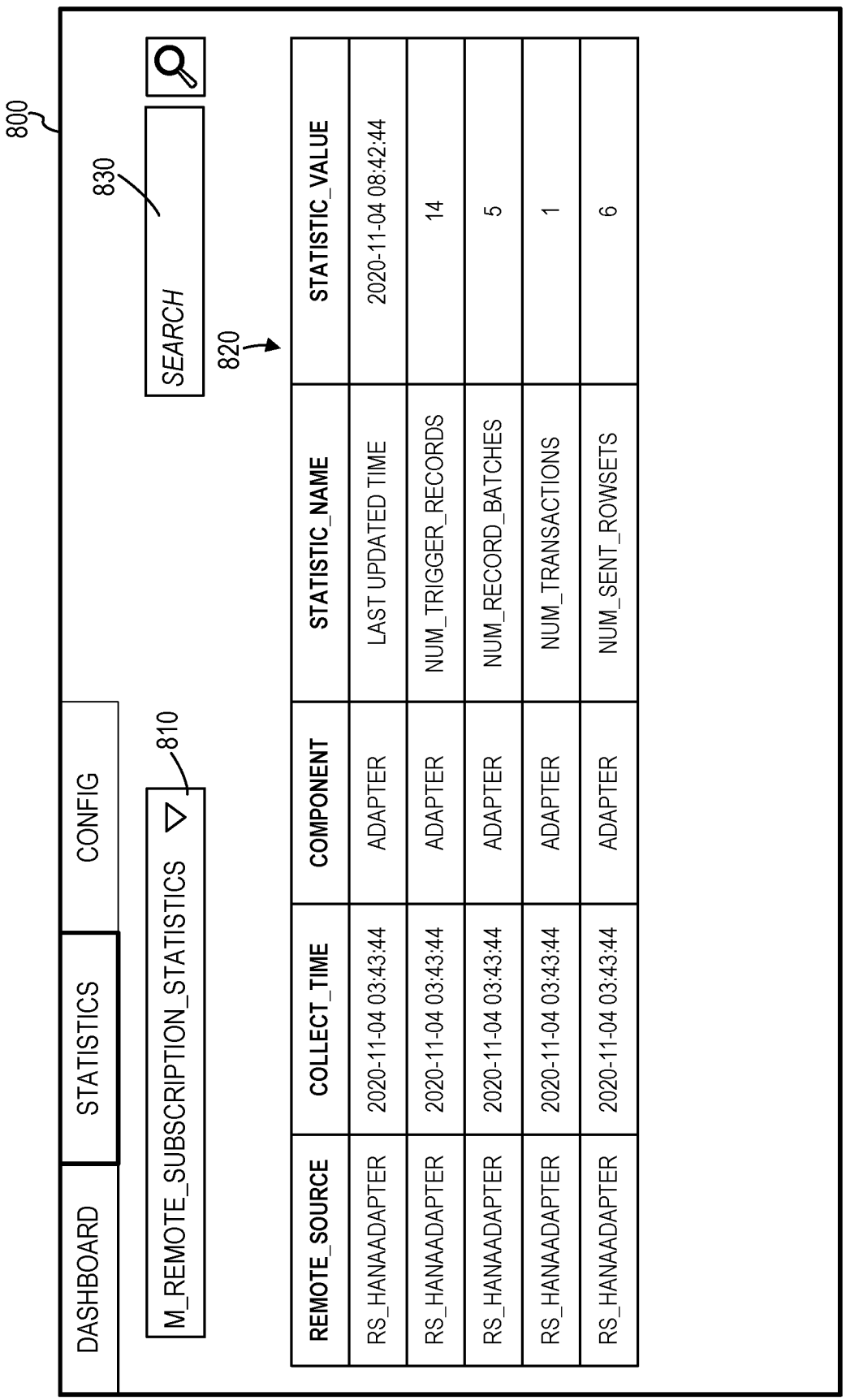
FIG. 8 illustrates an example GUI of the software tool via which data replication statistics are displayed.

In some example embodiments, the software tool 370 also provides a GUI in which the user may request and view statistics about the data replication performed by the data replication system 310. Instead of having to navigate to a separate application or software tool to access the source database 350 or the target database 360 to query the source table or the target table for data replication statistics, the user can use the same software tool 370 that the user used to perform the other data replication tasks. FIG. 8 illustrates an example GUI 800 of the software tool 370 via which data replication statistics 820 are displayed. In FIG. 8, the GUI 800 includes a selectable user interface element 810 configured to enable the user to specify statistics to be displayed. For example, the selectable user interface elements 810 may comprise a drop-down menu of a list of source databases 350 from which the user may select to view statistics for the data replication performed for the selected source database 350. The GUI 800 may also include a search field 830 configured to receive one or more search terms from the user. In response to receiving the search terms from the user via the search field 830, the software tool 370 may narrow the statistics 820 displayed to only those statistics that have metadata or an attribute that matches the search terms. Examples of the statistics 820 that may be generated and displayed by the software tool 370 include, but are not limited to, a last updated time, a number of records that have been replicated, a number of batches of records that have been replicated, and a number of database transactions that have occurred, as well as many other types of statistics.

Figure 9:
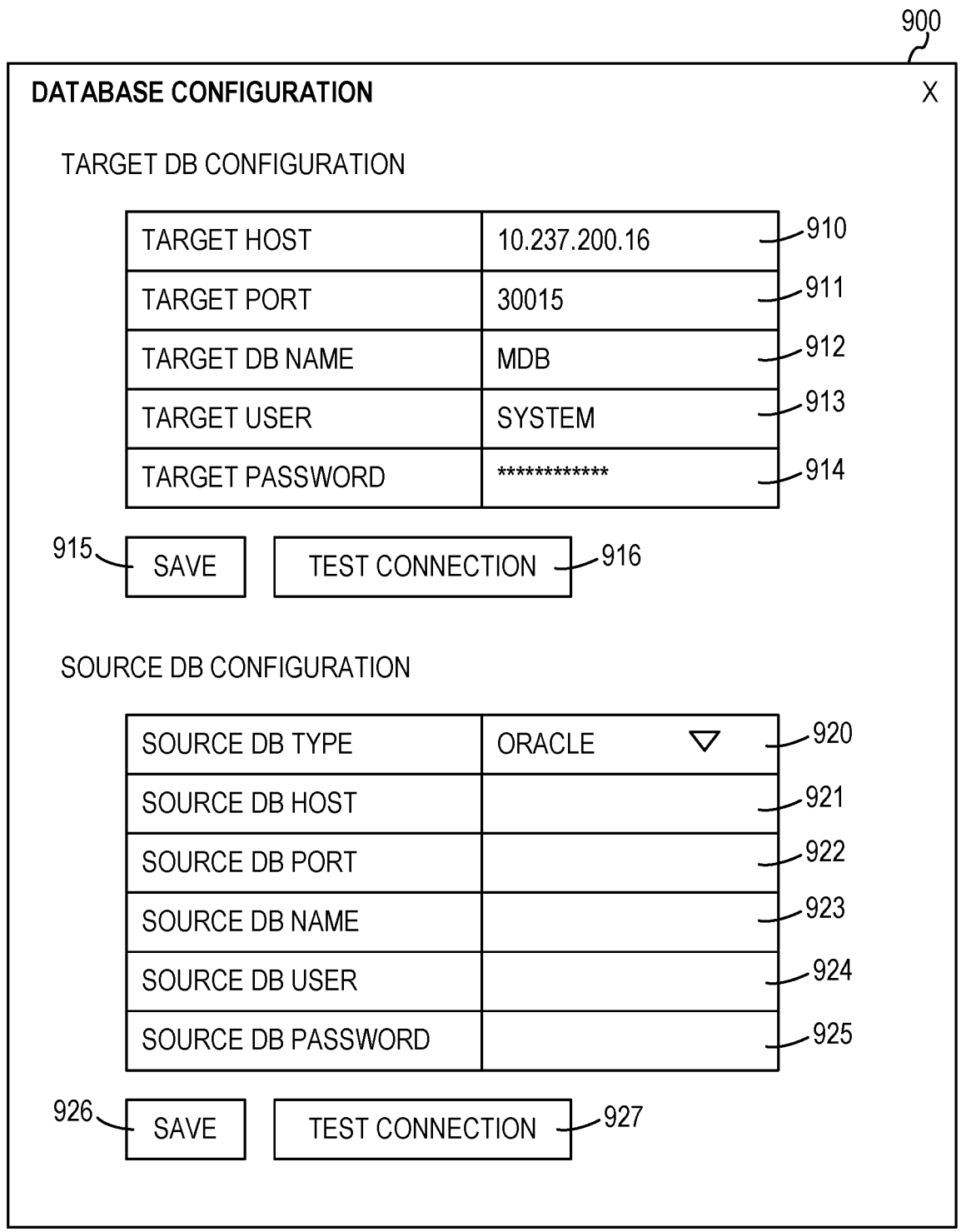
FIG. 9 illustrates an example GUI of the software tool via which a configuration of a target database and a configuration of a source database is received.

FIG. 9 illustrates an example GUI 900 of the software tool 370 via which a configuration of a target database 360 and a configuration of a source database 350 is received. In some example embodiments, the GUI 900 is displayed in response to a user selection of a selectable user interface element in the GUI 400, such as a selectable button in a navigation bar. For example, in FIG. 4, the GUI 400 comprises a navigation bar comprising corresponding selectable user interface elements for configuring a data replication and a data generation (e.g., a selectable "DASHBOARD" button or other user interface element), for viewing statistics (e.g., a selectable "STATISTICS" button or other user interface element), and for configuring a target database 360 and a source database 350 (e.g., a selectable "CONFIG" button or other user interface element).

In FIG. 9, the GUI 900 may be configured to enable the user to configure the target database 360 and to configure the source database 350. For example, the user may specify aspects of the target database 360 via fields 910, 911, 912, 913, and 914. The field 910 is dedicated to and configured to receive a host for the target database 360. The field 911 is dedicated to and configured to receive a port for the target database 360. The field 912 is dedicated to and configured to receive a name for the target database 360. The field 913 is dedicated to and configured to receive a user for the target database 360. The field 914 is dedicated to and configured to receive a password for the target database 360. The GUI 900 may also include a selectable user interface element 915 that is configured to, in response to its selection, save the configuration details of the target database 360 that were specified by the user via the fields 910, 911, 912, 913, and 914. The saved configuration details may then be used by the software tool 370 in implementing the previously-discussed data replication configuration specified by the user. The GUI 900 may also include a selectable user interface element 916 that is configured to, in response to its selection, test the connection to the target database 360 specified by the configuration details provided by the user via the fields 910, 911, 912, 913, and 914.

In FIG. 9, the user may also use the GUI 900 to specify aspects of a source database 350 via fields 920, 921, 922, 923, 924, and 925. The field 920 is dedicated to and configured to receive a type of source database that is to be configured. For example, the field 920 may comprise a drop-down menu from which the user may select a type of source database to configure. Once the user has specified the type of source database to be configured via the field 920, the user may use the fields 921, 922, 923, 24, and 925 to specify configuration details for that type of source database. The field 921 is dedicated to and configured to receive a host for the source database 350. The field 922 is dedicated to and configured to receive a port for the source database 350. The field 923 is dedicated to and configured to receive a name for the source database 350. The field 924 is dedicated to and configured to receive a user for the source database 350. The field 925 is dedicated to and configured to receive a password for the source database 350. The GUI 900 may also include a selectable user interface element 926 that is configured to, in response to its selection, save the configuration details of the source database 350 that were specified by the user for the specified type of source database via the fields 921, 922, 923, 924, and 925. The saved configuration details may then be used by the software tool 370 in implementing the previously-discussed data replication configuration specified by the user. The GUI 900 may also include a selectable user interface element 927 that is configured to, in response to its selection, test the connection to the source database 350 specified by the configuration details provided by the user via the fields 921, 922, 923, 924, and 925.

Figure 10:
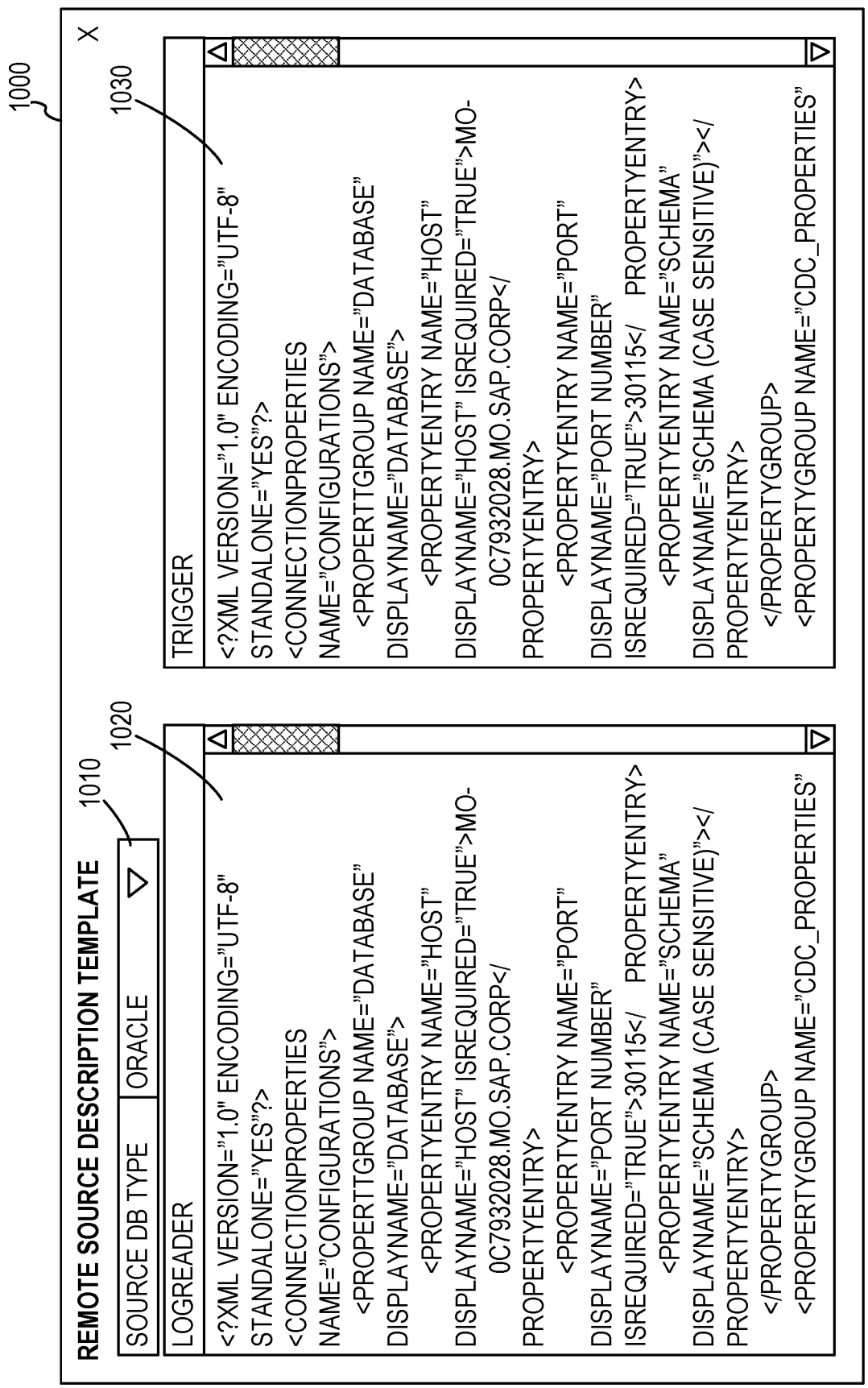
FIG. 10 illustrates an example GUI of the software tool via which a description template for a source database is provided for editing.

FIG. 10 illustrates an example GUI 1000 of the software tool 370 via which a description template for a source database 350 is provided for editing. In some example embodiments, the GUI 1000 is displayed in response to a user selection of a selectable user interface element in the GUI 400, such as a selectable button in a navigation bar. For example, in FIG. 4, the GUI 400 comprises a navigation bar comprising a selectable "CONFIG" button that triggers a drop-down menu to be displayed in response to its selection. The drop-down menu may comprise a selectable user interface element configured to trigger the display of the GUI 900 in response to its selection, as well as a selectable user interface element configured to trigger the display of the GUI 1000 in response its selection.

In FIG. 10, the GUI 1000 may include a user interface element 1010 configured to enable the user to specify a type of source database for which the GUI 1000 will provide a description template for editing by the user. For example, the user interface element 1010 may comprise a drop-down menu that includes a list of types of source databases from which the user may select. In response to a selection of a type of source database by the user via the user interface element 1010, the GUI 1000 may display an XML source definition for a log-based capture mode for the source database 350 in a field 1020, as well as an XML, source definition for a trigger-based capture mode for the source database 350 in a field 1030. The user may edit the XML source definition for the log-based capture mode for the source database 350 using the field 1020, and may also edit the XML source definition for the trigger-based capture mode for the source database 350 using the field 1030. In response to the user saving the XML source definitions in the fields 1020 and 1030, such as by selectin a "SAVE" button or the like, the software tool 370 may use the saved XML source definitions as templates for use when displaying the XML source definition of the source database 350 in field 530 in FIG. 5.

Figure 11:
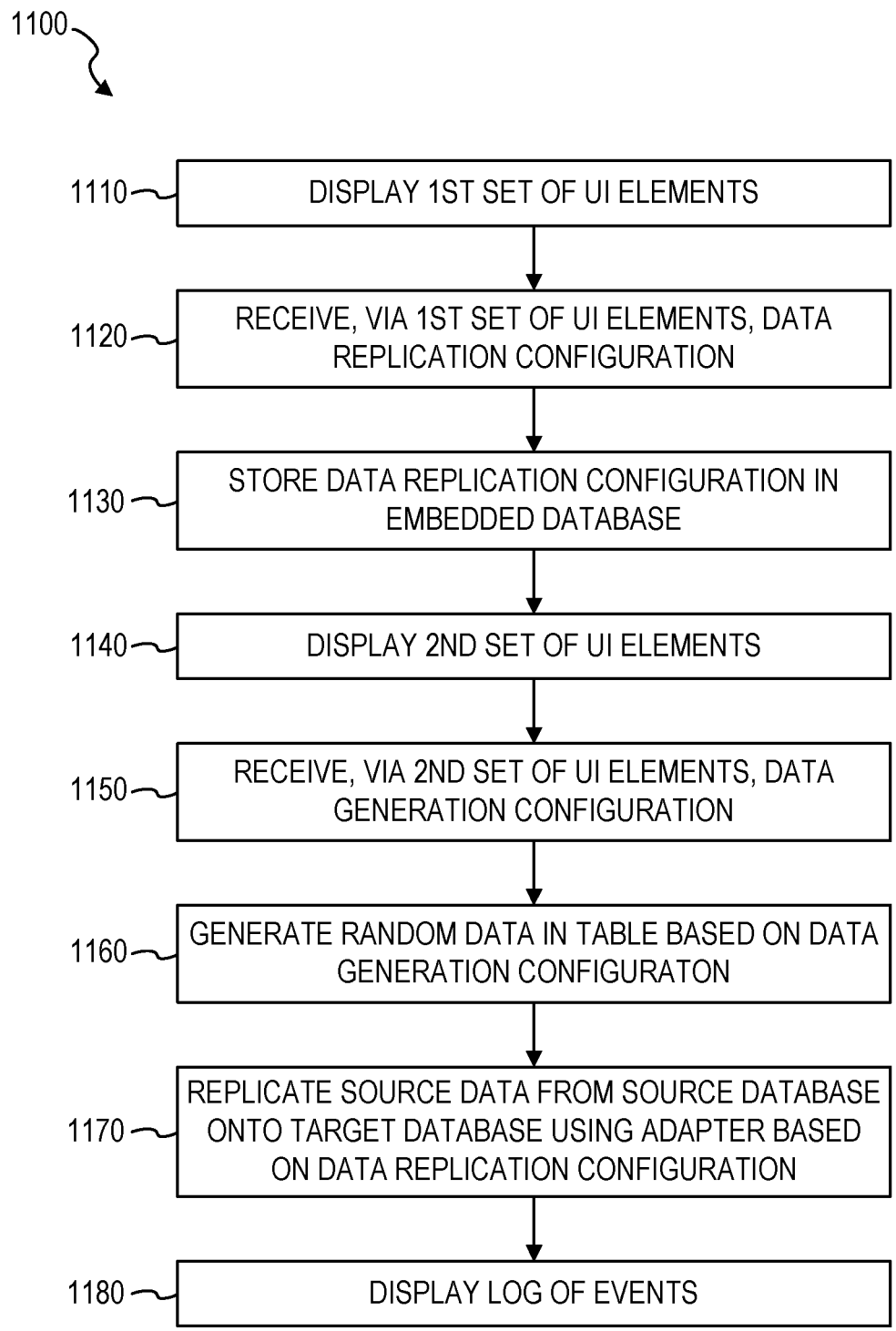
FIG. 11 is a flowchart illustrating an example method of implementing an integrated testing tool for data replication.

FIG. 11 is a flowchart illustrating an example method 1100 of implementing an integrated testing tool for data replication. The method 1100 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1100 are performed by the software tool 370 of FIG. 3.

At operation 1110, the software tool 370 causes a first set of user interface elements of the software tool 370 to be displayed on a computing device (e.g., on the client machine 116 or on the small client machine 122 in FIG. 1). For example, the software tool 370 may cause one or more of the user interface elements of FIGS. 4-6 to be displayed on the computing device.

Next, the software tool 370 may, at operation 1120, receive, from the computing device via the first set of user interface elements, a data replication configuration. In some example embodiments, the data replication configuration identifies an adapter, a source database, and a target database. For example, the software tool 370 may receive indications of user selections of the user interface elements of FIGS. 4-6 as the data replication configuration. In some example embodiments, the software tool 370 causes a selectable user interface element to be displayed on the computing device in association with the adapter (e.g., selectable user interface element 420 in FIG. 4), receives a user selection of the selectable user interface element, and triggers a creation of an instance of the adapter in response to a user selection of the selectable user interface element. The software tool 370 may also cause a selectable user interface element to be displayed on the computing device in association with the source database (e.g., selectable user interface element 540 in FIG. 5), receive a user selection of the selectable user interface element, and trigger a creation of the source database in response to a user selection of the selectable user interface element.

Additionally, the software tool 370 may cause a selectable user interface element to be displayed on the computing device in association with the source table in the source database (e.g., selectable user interface element 660 in FIG. 6), receive a user selection of the selectable user interface element, and trigger a creation of the source table in the source database in response to a user selection of the selectable user interface element. Furthermore. The software tool 370 may cause a selectable user interface element to be displayed on the computing device in association with the target table (e.g., selectable user interface element 670 in FIG. 7), receiving a user selection of the selectable user interface element from the computing device, and trigger a creation of the target table and a virtual table in the target database in response to a user selection of the selectable user interface element.

The software tool 370 may then store the data replication configuration in the embedded database 380 of the software tool 370, at operation 1130. The embedded database 380 may be dedicated to the software tool 370 rather than shared among multiple software tools or applications, and the embedded database 380 may be packaged into and managed by the software tool 370.

At operation 1140, the software tool 370 may cause a second set of user interface elements of the software tool 370 to be displayed on the computing device. For example, the second set of user interface elements may comprise the user interface elements of the GUI 700 in FIG. 7.

Next, the software tool 370 may, at operation 1150, receive, from the computing device via the second set of user interface elements, a data generation configuration identifying a source table in the source database. As previously discussed above with respect to FIG. 7, the data generation configuration may comprise a number of rows for which to randomly generate data for the source table.

The software tool 370 may then generate random data in the identified source table, at operation 1160, based on the data generation configuration. For example, the software tool 370 may use a random number generator to generate random data, and then insert the generated random data into the identified source table.

At operation 1170, the software tool 370 may instruct the adapter 330 to perform replicating of the source data from the source database 350 onto the target database 360 based on the data replication configuration stored in the embedded database 380 of the software tool 370. In some example embodiments, as a result of the insertion of the random data into the source tables of the source database 350, the software tool 370 detects the change to the source tables of the source database 350, and then instructs the corresponding adapter 330 of the data provisioning agent 320 to replicate the change of data in the corresponding target tables of the target database 360 based on the data replication configuration stored in the embedded database 380.

The software tool 370 may, at operation 1180, cause a log of events 452 to be displayed on the computing device. The log of events 452 may comprise the generating of the random data in the identified source table and the replicating of the source data from the source table onto the target table. In some example embodiments, the log events 452 are displayed within a text-based user interface 450 on the computing device.

It is contemplated that any of the other features described within the present disclosure can be incorporated into the method 1100.

Figure 12:
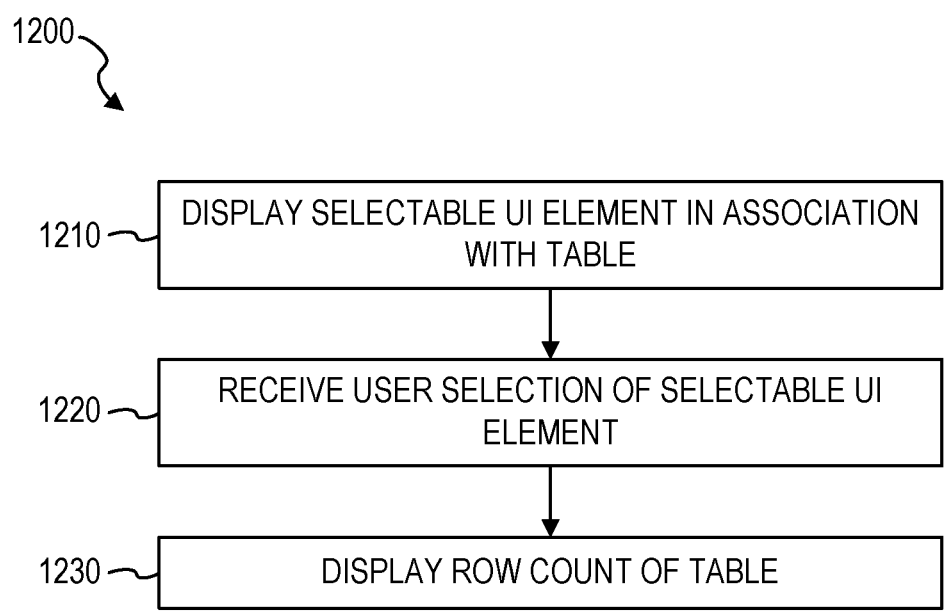
FIG. 12 is a flowchart illustrating an example method of verifying data replication.

FIG. 12 is a flowchart illustrating an example method 1200 of verifying data replication. The method 1200 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1200 are performed by the software tool 370 of FIG. 3. The method 1200 may comprise operations 1210, 1220, and 1230. The operations 1210, 1220, and 1230 may be performed as part of the method 1100 of FIG. 11. For example, the operations 1210, 1220, and 1230 may be performed prior to, subsequent to, or concurrently with any of the operations 1010, 1020, 1030, 1040, 1050, 1060, 1070, or 1080 of the method 1000 of FIG. 10.

At operation 1210, the software tool 370 causes a selectable user interface element to be displayed on the computing device in association with the identified table. The selectable user interface element may comprise an indication that it is configured to trigger, in response to its selection, a display of a row count of a table. For example, the software tool 370 may cause the selectable user interface element 446 in FIG. 4 to be displayed on the computing device.

Next, the software tool 370 may receive a user selection of the selectable user interface element from the computing device, at operation 1220. For example, the software tool 370 may receive an indication that a user selected the selectable user interface element 446 in FIG. 4.

Then, at operation 1230, the software tool 370 may cause a row count of the source table and a row count of the target table to be displayed on the computing device in response to the receiving of the user selection of the selectable user interface element.

It is contemplated that any of the other features described within the present disclosure can be incorporated into the method 1200.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: causing, by a software tool, a first set of user interface elements of the software tool to be displayed on a computing device; receiving, by the software tool from the computing device via the first set of user interface elements, a data replication configuration identifying an adapter, a source database, and a target database; storing, by the software tool, the data replication configuration in an embedded database of the software tool; causing, by the software tool, a second set of user interface elements of the software tool to be displayed on the computing device; receiving, by the software tool from the computing device via the second set of user interface elements, a data generation configuration identifying a table in the source database; generating, by the software tool, random data in the identified table based on the data generation configuration; instructing, by the software tool, the adapter to perform replicating of the source data from the source database onto the target database based on the data replication configuration stored in the embedded database of the software tool; and causing, by the software tool, a log of events to be displayed on the computing device, the log of events comprising the generating of the random data in the identified table and the replicating of the source data from the source database onto the target database.

Example 2 includes the computer-implemented method of example 1, further comprising: causing, by the software tool, a selectable user interface element to be displayed on the computing device in association with the identified table; receiving, by the software tool from the computing device, a user selection of the selectable user interface element; and causing, by the software tool, a row count of the identified table to be displayed on the computing device in response to the receiving of the user selection of the selectable user interface element.

Example 3 includes the computer-implemented method of example 1 or example 2, further comprising: causing, by the software tool, a selectable user interface element to be displayed on the computing device in association with the adapter; receiving, by the software tool from the computing device, a user selection of the selectable user interface element; and triggering, by the software tool, a creation of an instance of the adapter in response to a user selection of the selectable user interface element.

Example 4 includes the computer-implemented method of any one of examples 1 to 3, further comprising: causing, by the software tool, a selectable user interface element to be displayed on the computing device in association with the source database; receiving, by the software tool from the computing device, a user selection of the selectable user interface element; and triggering, by the software tool, a creation of the source database in response to a user selection of the selectable user interface element.

Example 5 includes the computer-implemented method of any one of examples 1 to 4, further comprising: causing, by the software tool, a selectable user interface element to be displayed on the computing device in association with the target table in the source database; receiving, by the software tool from the computing device, a user selection of the selectable user interface element; and triggering, by the software tool, a creation of the target table and a virtual table in the target database in response to a user selection of the selectable user interface element.

Example 6 includes the computer-implemented method of any one of examples 1 to 5, wherein the causing the log of events to be displayed on the computing device comprises causing the log events to be displayed within a text-based user interface on the computing device.

Example 7 includes the computer-implemented method of any one of examples 1 to 6, wherein: one or more of the first set of user interface elements of the software tool are displayed on a first page of the software tool; one or more of the second set of user interface elements of the software tool are displayed on the first page of the software tool; and the log of events is displayed on the first page of the software tool.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 13:
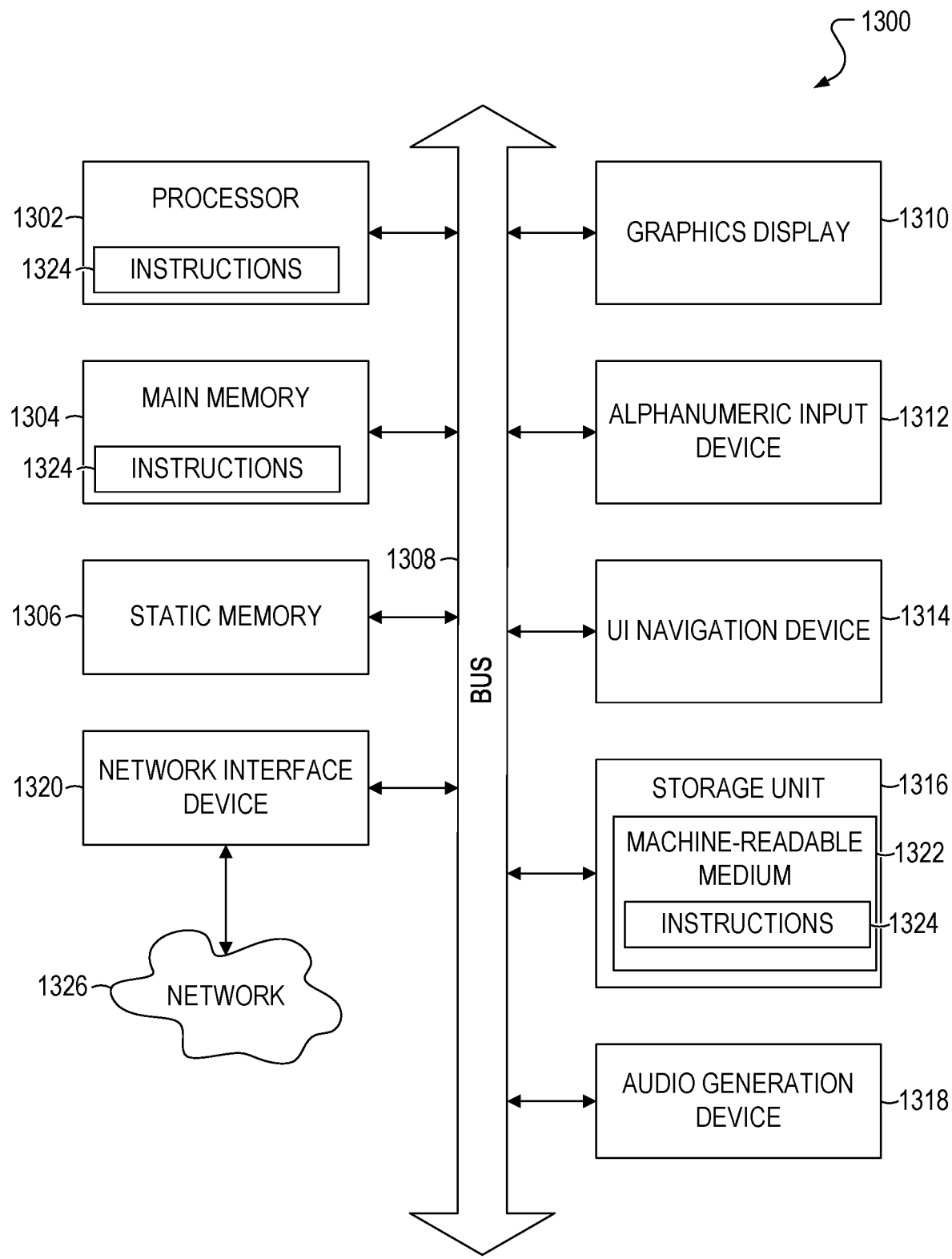
FIG. 13 is a block diagram of an example computer system on which methodologies described herein can be executed.

FIG. 13 is a block diagram of a machine in the example form of a computer system 1300 within which instructions 1324 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304, and a static memory 1306, which communicate with each other via a bus 1308. The computer system 1300 may further include a graphics or video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a storage unit (e.g., a disk drive unit) 1316, an audio or signal generation device 1318 (e.g., a speaker), and a network interface device 1320.

The storage unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
    causing, by a software tool, a first set of user interface elements of the software tool to be displayed on a computing device;
    receiving, by the software tool from the computing device via the first set of user interface elements, a data replication configuration identifying an adapter, a source table in a source database, and a target table in a target database;
    storing, by the software tool, the data replication configuration in an embedded database of the software tool;
    causing, by the software tool, a second set of user interface elements of the software tool to be displayed on the computing device;

receiving, by the software tool from the computing device via the second set of user interface elements, a data generation configuration identifying the source table in the source database;

generating, by the software tool, random data in the source table based on the data generation configuration;

instructing, by the software tool, the adapter to perform replicating of the source data from the source table into the target table based on the data replication configuration stored in the embedded database of the software tool; and causing, by the software tool, a log of events to be displayed on the computing device, the log of events comprising the generating of the random data in the source table and the replicating of the source data from the source table into the target table.

2. The computer-implemented method of claim 1, further comprising:

causing, by the software tool, a selectable user interface element to be displayed on the computing device in association with the source table and the target table;

receiving, by the software tool from the computing device, a user selection of the selectable user interface element; and causing, by the software tool, a row count of the source table and a row count of the target table in the target database to be displayed on the computing device in response to the receiving of the user selection of the selectable user interface element.

3. The computer-implemented method of claim 1, further comprising:

causing, by the software tool, a selectable user interface element to be displayed on the computing device in association with the adapter;

receiving, by the software tool from the computing device, a user selection of the selectable user interface element; and triggering, by the software tool, a creation of an instance of the adapter in response to a user selection of the selectable user interface element.

4. The computer-implemented method of claim 1, further comprising:

causing, by the software tool, a selectable user interface element to be displayed on the computing device in association with the source table;

receiving, by the software tool from the computing device, a user selection of the selectable user interface element; and triggering, by the software tool, a creation of the source table in response to a user selection of the selectable user interface element.

5. The computer-implemented method of claim 1, further comprising:

causing, by the software tool, a selectable user interface element to be displayed on the computing device in association with the target table;

receiving, by the software tool from the computing device, a user selection of the selectable user interface element; and triggering, by the software tool, a creation of the target table and a virtual table in the target database in response to a user selection of the selectable user interface element.

6. The computer-implemented method of claim 1, wherein the causing the log of events to be displayed on the computing device comprises causing the log events to be displayed within a text-based user interface on the computing device.

7. The computer-implemented method of claim 1, wherein:

one or more of the first set of user interface elements of the software tool are displayed on a first page of the software tool;

one or more of the second set of user interface elements of the software tool are displayed on the first page of the software tool; and the log of events is displayed on the first page of the software tool.

8. A system of comprising:

at least one hardware processor; and a non-transitory computer-readable medium storing executable instructions that, when executed, cause the at least one processor to perform operations comprising:

causing, by a software tool, a first set of user interface elements of the software tool to be displayed on a computing device;

receiving, by the software tool from the computing device via the first set of user interface elements, a data replication configuration identifying an adapter, a source database, and a target database;

storing, by the software tool, the data replication configuration in an embedded database of the software tool;

causing, by the software tool, a second set of user interface elements of the software tool to be displayed on the computing device;

receiving, by the software tool from the computing device via the second set of user interface elements, a data generation configuration identifying a table in the source database;

generating, by the software tool, random data in the identified table based on the data generation configuration;

instructing, by the software tool, the adapter to perform replicating of the source data from the source database onto the target database based on the data replication configuration stored in the embedded database of the software tool; and causing, by the software tool, a log of events to be displayed on the computing device, the log of events comprising the generating of the random data in the identified table and the replicating of the source data from the source database onto the target database.

9. The system of claim 8, wherein the operations further comprise:

causing, by the software tool, a selectable user interface element to be displayed on the computing device in association with the identified table;

receiving, by the software tool from the computing device, a user selection of the selectable user interface element; and causing, by the software tool, a row count of the identified table to be displayed on the computing device in response to the receiving of the user selection of the selectable user interface element.

10. The system of claim 8, wherein the operations further comprise:

causing, by the software tool, a selectable user interface element to be displayed on the computing device in association with the adapter;

receiving, by the software tool from the computing device, a user selection of the selectable user interface element; and triggering, by the software tool, a creation of an instance of the adapter in response to a user selection of the selectable user interface element.

11. The system of claim 8, wherein the operations further comprise:

causing, by the software tool, a selectable user interface element to be displayed on the computing device in association with the source database;

receiving, by the software tool from the computing device, a user selection of the selectable user interface element; and triggering, by the software tool, a creation of the source database in response to a user selection of the selectable user interface element.

12. The system of claim 8, wherein the operations further comprise:

causing, by the software tool, a selectable user interface element to be displayed on the computing device in association with the target table in the target database;

receiving, by the software tool from the computing device, a user selection of the selectable user interface element; and triggering, by the software tool, a creation of the target table and a virtual table in the target database in response to a user selection of the selectable user interface element.

13. The system of claim 8, wherein the causing the log of events to be displayed on the computing device comprises causing the log events to be displayed within a text-based user interface on the computing device.

14. The system of claim 8, wherein:

one or more of the first set of user interface elements of the software tool are displayed on a first page of the software tool;

one or more of the second set of user interface elements of the software tool are displayed on the first page of the software tool; and the log of events is displayed on the first page of the software tool.

15. A non-transitory machine-readable storage medium tangibly embodying a set of instructions that, when executed by at least one hardware processor, causes the at least one processor to perform operations comprising:

causing, by a software tool, a first set of user interface elements of the software tool to be displayed on a computing device;

receiving, by the software tool from the computing device via the first set of user interface elements, a data replication configuration identifying an adapter, a source database, and a target database;

storing, by the software tool, the data replication configuration in an embedded database of the software tool;

causing, by the software tool, a second set of user interface elements of the software tool to be displayed on the computing device;

receiving, by the software tool from the computing device via the second set of user interface elements, a data generation configuration identifying a table in the source database;

generating, by the software tool, random data in the identified table based on the data generation configuration;

instructing, by the software tool, the adapter to perform replicating of the source data from the source database onto the target database based on the data replication configuration stored in the embedded database of the software tool; and causing, by the software tool, a log of events to be displayed on the computing device, the log of events comprising the generating of the random data in the identified table and the replicating of the source data from the source database onto the target database.

16. The non-transitory machine-readable storage medium of claim 15, wherein the operations further comprise:

causing, by the software tool, a selectable user interface element to be displayed on the computing device in association with the identified table;

receiving, by the software tool from the computing device, a user selection of the selectable user interface element; and causing, by the software tool, a row count of the identified table to be displayed on the computing device in response to the receiving of the user selection of the selectable user interface element.

17. The non-transitory machine-readable storage medium of claim 15, wherein the operations further comprise:

causing, by the software tool, a selectable user interface element to be displayed on the computing device in association with the adapter;

receiving, by the software tool from the computing device, a user selection of the selectable user interface element; and triggering, by the software tool, a creation of an instance of the adapter in response to a user selection of the selectable user interface element.

18. The non-transitory machine-readable storage medium of claim 15, wherein the operations further comprise:

causing, by the software tool, a selectable user interface element to be displayed on the computing device in association with the source database;

receiving, by the software tool from the computing device, a user selection of the selectable user interface element; and triggering, by the software tool, a creation of the source database in response to a user selection of the selectable user interface element.

19. The non-transitory machine-readable storage medium of claim 15, wherein the operations further comprise:

causing, by the software tool, a selectable user interface element to be displayed on the computing device in association with the table in the source database;

receiving, by the software tool from the computing device, a user selection of the selectable user interface element; and triggering, by the software tool, a creation of the table in the source database in response to a user selection of the selectable user interface element.

20. The non-transitory machine-readable storage medium of claim 15, wherein the causing the log of events to be displayed on the computing device comprises causing the log events to be displayed within a text-based user interface on the computing device.

* * * * *